United States Patent [19]
Barnes

[11] Patent Number: 5,530,999
[45] Date of Patent: Jul. 2, 1996

[54] AXIAL LOCKING DEVICE

[76] Inventor: Austen H. Barnes, 3407 Rolborn Road, RR #2 Queensville, Ontario, Canada, L0G 1R0

[21] Appl. No.: 307,811
[22] PCT Filed: Apr. 2, 1993
[86] PCT No.: PCT/GB93/00674
  § 371 Date: Feb. 27, 1995
  § 102(e) Date: Feb. 27, 1995
[87] PCT Pub. No.: WO93/20357
  PCT Pub. Date: Oct. 14, 1993

[30] Foreign Application Priority Data
  Apr. 2, 1992 [GB] United Kingdom ........... 9207258
[51] Int. Cl.⁶ ............... A44B 21/00; F16L 37/00
[52] U.S. Cl. ............... 24/590; 24/597; 24/635; 411/554
[58] Field of Search ............... 24/590, 597, 635, 24/639, 640, 642; 411/554; 403/322

[56] References Cited

U.S. PATENT DOCUMENTS

| 2,291,975 | 8/1942 | Minero | 24/590 |
|---|---|---|---|
| 3,470,524 | 9/1969 | Culver | 24/597 |
| 3,675,499 | 7/1972 | Marosy | 24/597 |
| 4,709,454 | 12/1987 | Barnes . | |
| 4,944,073 | 7/1990 | Haug | 24/590 |

FOREIGN PATENT DOCUMENTS

| 2145964 | 9/1971 | Germany . |
|---|---|---|
| WO9015282 | 12/1990 | WIPO . |

*Primary Examiner*—Victor N. Sakran
*Attorney, Agent, or Firm*—Majestic, Parsons, Siebert & Hsue; Marks & Clerk

[57] ABSTRACT

An axial locking device has locking balls which engage in a groove in a male member to lock the male member to a female member. To effect locking, a first axial movement of the male member causes it to abut an end surface on a slider and pushes slider teeth against rotor teeth, and a return movement of the male member allows the slider and rotor to return, pushed by a spring. In this way, the rotor is caused to rotate and its internal cam surface moves the locking balls. To reduce the number of parts and simplify manufacture, retaining teeth are formed by U-shaped clips on the housing of the female member, and act to prevent rotation of the slider during its axial movement, and to prevent rotation of the rotor until the rotor teeth have cleared the retaining teeth, causing a click or snap action. During the return movement of the slider and rotor, the rotor teeth cam over the ends of the retaining teeth and continue to rotate the rotor in the same direction.

25 Claims, 5 Drawing Sheets

AXIAL LOCKING DEVICE

BACKGROUND OF THE INVENTION

The present invention relates to an axial locking device of the type for locking first and second separable members together by movement of the members relative to each other in one axial sense, followed by a return relative movement, and unlocking the members by a further relative in the first axial sense (repeat first relative movement), the device comprising a locking mechanism associated with the first member, the locking mechanism comprising a locking element for engaging the second member, to lock the members together, actuating means movable axially with respect to the first member and engageable by the second member when said relative movement occurs in the first axial sense, to initiate or cause actuation of the locking mechanism, locking means which are rotatable about an axis of relative movement between the two members to actuate the locking element, first, toothed thrust means associated with said actuating means, for applying rotary thrust, second, toothed thrust means which co-act with the first thrust means and are connected to the locking means to rotate the locking means and hence actuate the locking element, and spring means biassing the second thrust means axially against the first thrust means.

Such axial locking devices are described in U.S. Pat. No. 4,709,454 and WO 90/15282. Some uses of the devices are given for instance on pages 2, 3, 41 and 42 of WO 90/15282. The devices can have high wear capability and can accept wide manufacturing tolerances. As stress does not pass through the teeth of the thrust means, high strength can be achieved. The devices are easily produced in a wide range of materials, in general of any suitable rigid material, and can be produced in any size and in a wide range of quality levels, from aerospace to consumer products. In general, the devices can be used with any type of end termination, such as male or female threads for general purpose or specific use, swaged in sleeves for use as a rope or hawser joiner, or projection welds for joining to panels. The devices can have a hole through the centre to enable them to be used as fluid couplers. The devices can be used for computer cable connectors or jewellery clasps. One of the members can be provided with screw threading for screwing into, for instance, wood. Push button or plunger operation is possible for for instance cable latches. The locking mechanism can be mounted on a male member or on a female member.

The devices permit one-handed and/or speedy operation. No relative rotary movement is required between the two members. However, there is still a need to simplify the devices and to reduce the number of parts.

THE INVENTION

According to the invention, there are retaining means which are substantially fixed in a rotary sense with respect to the first thrust means and relative to which the second thrust means move axially during actuation, the arrangement being such that during said first relative movement a respective tooth of the second thrust means slides against the retaining means until the tooth reaches the end of the retaining means, when the tooth of the second thrust means is rotated by the respective tooth of the first thrust means, and during said return movement, said tooth of the second thrust means is able to cam over the end of the retaining means to rotate the second thrust means in the same rotary sense, and is able to engage an end surface of the next first thrust means tooth to bias the first thrust means in the return sense.

The invention enables the axial locking device to be further simplified and enables a number of parts to be further reduced. Thus the device can be made with only one spring and only two moving parts in addition to the spring. The device can be arranged to give a positive snap action when locking and when unlocking, which gives a clear indication of operation. There are wide design choices, such as having a long or short stroke, or having a high or low actuation force. For instance, in order to increase the stroke, the number of teeth on the thrust means can be reduced or the tooth angle can be reduced to less than 45°. To decrease the stroke, the number of teeth can be increased or the tooth angle can be increased to a maximum of, say, 45°. The strength can be increased by increasing the size and number of the locking elements; it is possible to have just one element, say one locking ball, with two or more locking elements for medium sized units and three or more for large diameter units; the preferred maximum number of locking elements is the number equal to the number of teeth on the first or on the second rotary thrust means; in general, the greater the number of locking elements, the greater the strength; if there was a single locking element, there is an asymmetric force which can be countered by an increased length to diameter ratio. Alternatively or in addition, the strength can be increased by increasing the diameter of the first and second members, increasing the housing wall thickness and/or increasing the strength of the material. Thus the device can be tailored to any suitable need with any suitable configuration, with no relationship between the strength of the unit and the desired operating force or say resistance to vibration.

The locking means can comprise a cam surface which rotates relative to the locking element when the locking means are rotated and cams the locking element into a position locking the first and second members together, and when the locking means are further rotated, permits the locking element to move into a position not locking the first and second members together. Although the locking element is preferably substantially fixed relative to the first member in a rotary sense, size can be reduced by fixing the cam surface relative to the first member in a rotary sense, and the cam surface itself can be formed by e.g. flutes in the housing of the device, the locking elements being cammed by the housing as the locking elements rotate past. The cam surface can have a number of lobes which is equal to half the number of teeth of the first or of the second rotary thrust means, e.g. generally elliptical in section if there are four such teeth, generally square in section if there are eight such teeth, or generally octagonal in section if there are sixteen such teeth.

The actuating means and the locking means can have the same internal and external diameters, so that the device can be very compact in diameter but have a greater length to diameter ratio. Although one suitable device is 30 mm long and has an operating stroke of 7 mm, the devices can be made in any size, for instance 8 mm long with an operating stroke of 2.5 mm and a 3 mm diameter. The locking means can be in the form of a through-bore cylinder and the respective male member or second member can be inserted in the bore and have a shoulder to engage the actuating means.

As in the devices of the prior art, the separable members can be arranged to lock instantly when pushed together and to unlock instantly when pushed together again against a spring.

The first thrust means can be actuated either directly or using a plunger arrangement, and the locking element(s) can be located radially inwards or outwards of the operating teeth, or axially displaced from the operating teeth. The locking mechanism can be arranged in the centre, rather than outside the male member, the locking element(s) being moved radially outwards to lock.

The rotation of the first and second thrust means and the locking means will normally be about the axis of the first and second members.

The first relative movement need not just initiate actuation of the locking mechanism; it could cause the locking mechanism to move into a fully locked position.

The actuating means, locking means and thrust means can be made of plastics or metal of injection moulded or die-cast construction.

PREFERRED EMBODIMENTS

The invention will be further described, by way of example, with reference to the accompanying drawings, in which.

FIGS. 1 AND 2

Figure 1:
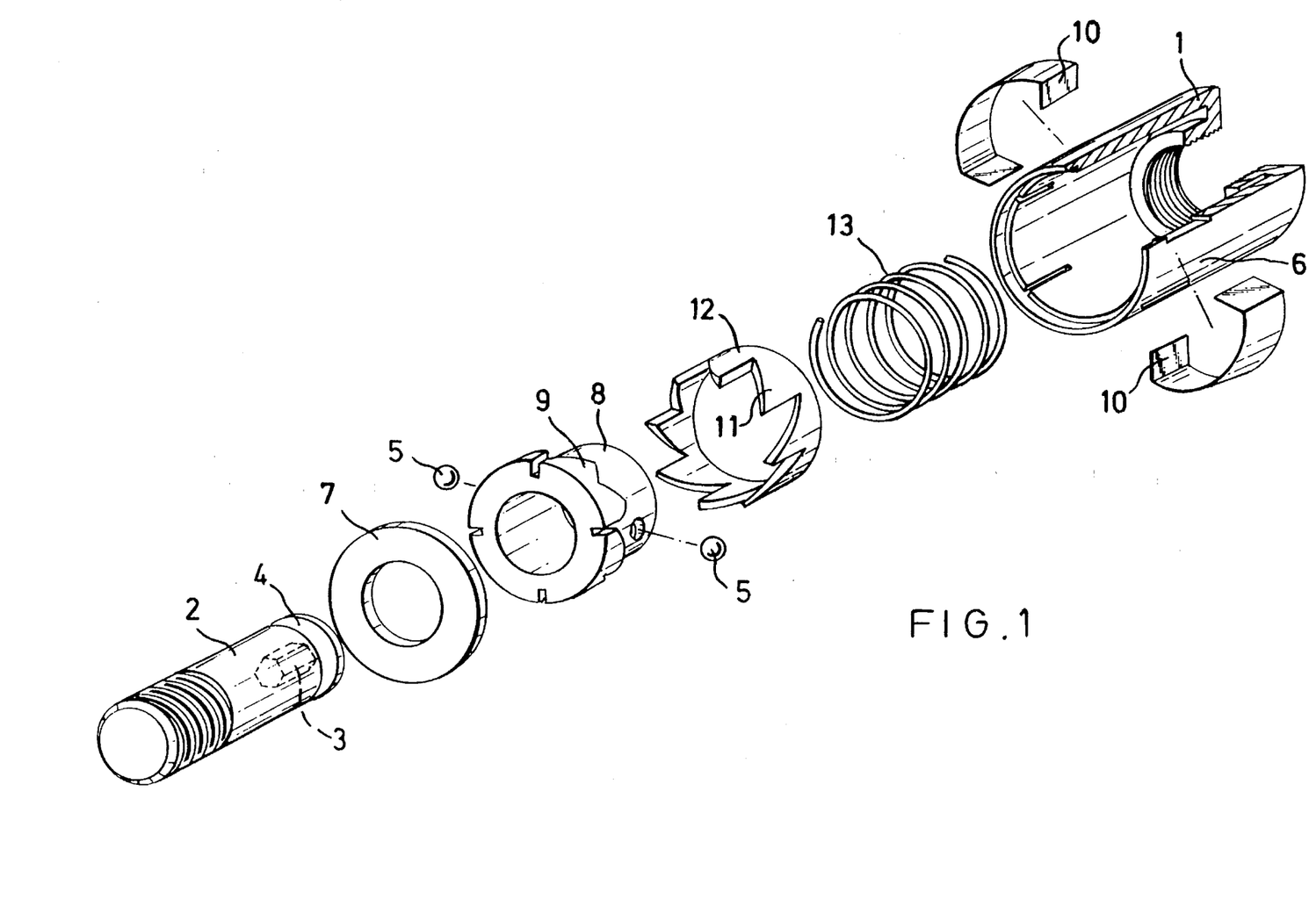
FIG. 1 is an exploded isometric view of a first device in accordance with the invention.
Figure 2:
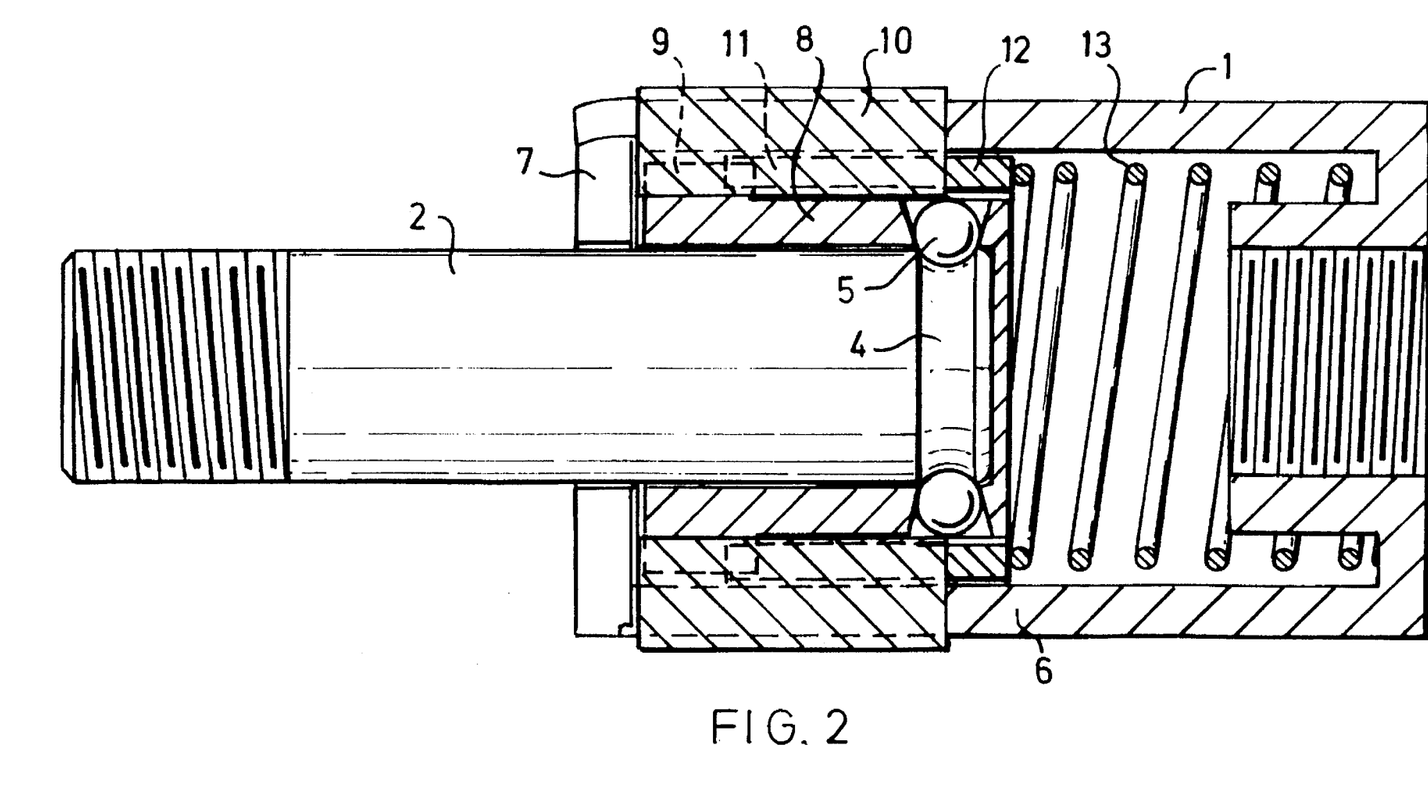
FIG. 2 is a view, mainly an axial section, of the first device.

In FIGS. 1 to 3, the first member 1 is a female member with any suitable end termination (shown as female threading). The second member 2 is a male member or stud with any suitable end termination (shown as male threading), FIG. 1 showing a hexagonal bore 3 for receiving a hexagonal key, for fitting the end termination to another member. The male member 2 has an annular groove 4 for receiving locking elements in the form of balls 5. The female member 1 provides a housing 6 for the device, with an annular end cap 7. FIG. 2 shows two different ways of securing the end cap 7. On the top part, it is shown as swaged whereas on the bottom part, it is shown as having a rebate for an ultrasonic weld assembly. As an alternative, the end cap 7 can be locked by a circlip or tangential locking wire inserted into a radial groove in the end cap 3 and housing 6, to provide disassembly capability. In the housing 6, there is a locking mechanism formed by actuating means and first axially-movable toothed rotary thrust means which are integral with each other in the form of a cup-like slider 8, the male member 2 engaging the base of the cup to initiate actuation of the locking mechanism. The slider 8 has teeth 9 of a particular shape, which are described below. The slider 8 is constrained only to axial motion by retaining means in the form of retaining teeth 10 which engage in slots between pairs of slider teeth 9, there being two slider teeth 9 between each pair of retaining teeth 10. The retaining teeth are fixed with respect to the housing of the female member 1.

The retaining teeth 10 act as linear guides with no inclined tooth profile. There is no specific shape that is required for the retaining teeth 10, and they can be rectangular, oval/ oblong, or thin blade. Though shown as square-ended, the retaining teeth 10 could have a wedge-shaped open end, the inclination of the wedge being equal to the inclination of the trailing flanks of the rotor teeth 11. The retaining teeth 10 can be formed (as shown) on C-form snap-in inserts made of spring steel, or could be for instance stamped out of steel sheet and inserted in slots, punched or otherwise, formed in the housing 6, or could be formed integrally with the housing 6, which increases the strength of the housing 6 at the entrance end. Though they could be much wider than shown, the retaining teeth 10 are shown as substantially thinner, in the circumferential sense, than the slider teeth 9 or the rotor teeth 11, their circumferential thickness being less than one fifth of the circumferential thickness of the teeth 9, 11, and shown as about one ninth or one tenth of such thickness. Though shown as being four retaining teeth 10 at 90°, there could be for instance two or six equally-spaced retaining teeth 10.

The slider teeth 9 co-act with rotor teeth 11 of second axially-movable toothed rotary thrust means which are integral with locking means and in the form of a rotary cam or rotor 12. The arrangement is such that the locking balls 5 in an axial sense are between the zone of the slider and rotor teeth 9, 11 and the zone of engagement of the slider 8 by the end of the male member 2. The rotor 12 can both move axially and rotate about the axis of the device, which is the axis of relative rectilinear movement between the first and second members 1, 2, and is a loose fit over the slider 8. In operation the rotor 12 rotates while the locking balls 5 are in the rotary sense fixed relative to the male member 1. The whole internal surface of the rotor 12 has a cam internal profile of generally square shape with radiussed corners, so that at four positions at 90°, the locking balls 5 are forced into the annular groove 4, and at the intermediate 45° positions, the locking balls 5 are free to move out of the annular groove 4. In this way, the members 1, 2 can be locked and unlocked to and from each other. In theory, it would be possible to have just one slider tooth 9 of sufficiently wide circumferential extent, with one retaining tooth 10 and one rotor tooth 11, though it is preferred to have a minimum of two slider teeth 9.

There is a single helical compression spring 13 for effecting the return axial motion of the slider 8 and of the rotor 12, acting directly on the rotor 12 and biasing it in the direction of the return movement of the members 1, 2.

Figure 3A:
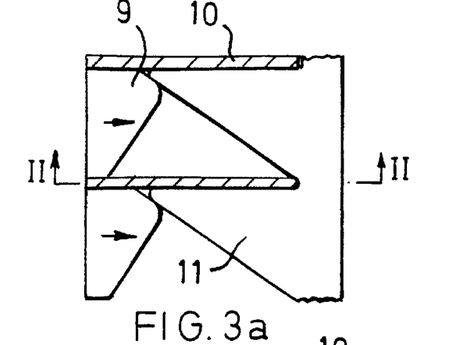
FIGS. 3a to 3g are schematic views in circumferential section, showing the operation of the first device.
Figure 3B:
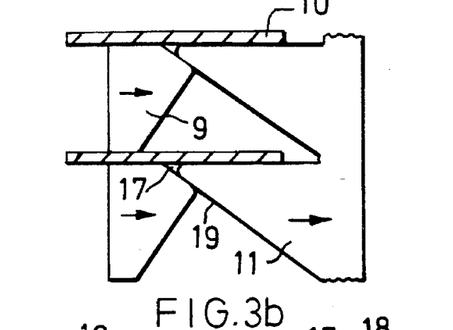
Figure 3C:
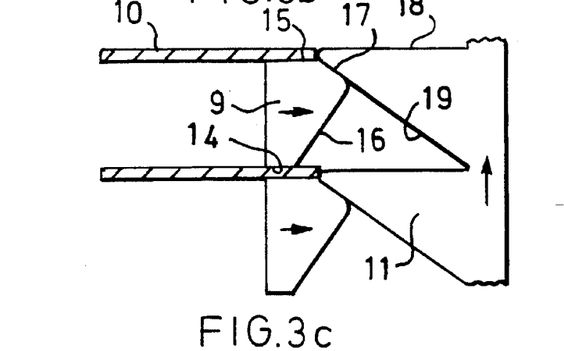
Figure 3D:
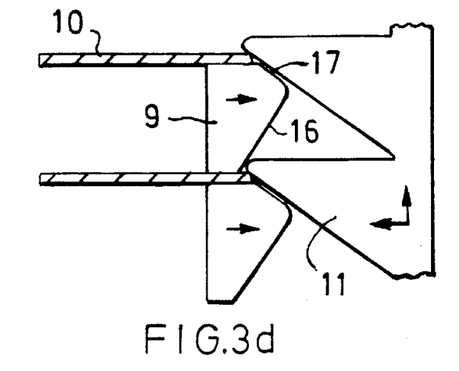
Figure 3E:
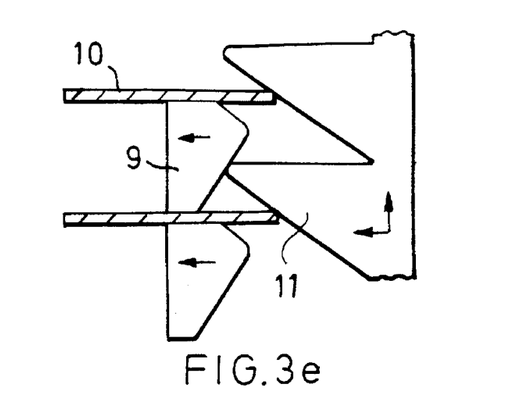
Figure 3F:
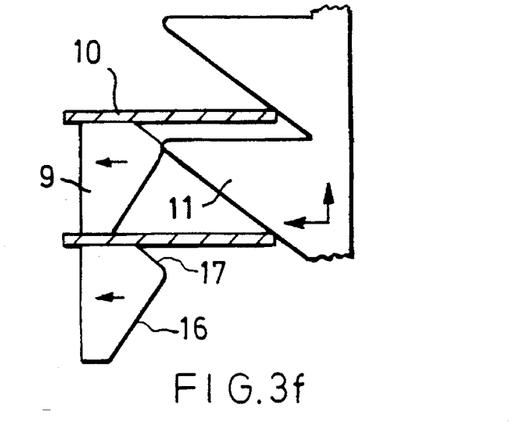
Figure 3G:
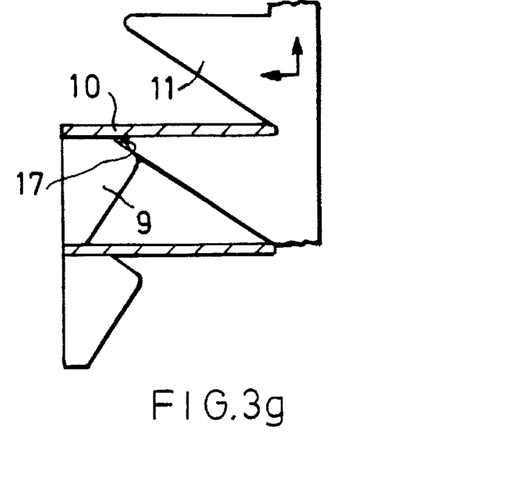

As best seen in FIG. 3c, the slider teeth 9 have, relative to the direction of rotation of the rotor teeth 11, an axial-parallel leading edge 14 which projects axially less than an axially-parallel trailing edge 15, i.e. the trailing edge 15 is higher than the leading edge 14. The slider tooth 9 has a hump, there being a portion between the leading and trailing edges 14, 15, which projects more than the leading and trailing edges 14, 15, formed by an inclined leading flank 16 and an inclined trailing flank 17. The rotor teeth 11 have, relative to their direction of rotation, a leading flank 18 which is substantially axial-parallel and an inclined trailing flank 19. Although the teeth 11 are shown as having 45° trailing flanks rotor 19, the angle could be reduced to reduce friction and provide greater mechanical advantage and a more positive snap action. The preferred angle for the flanks 16, 19 is 45° or less.

One example of the device of FIGS. 1 and 2 has the female housing diameter of ¾ inch (19.05 mm) and a length of 1⅛ inch (28.575 mm). The members 1, 2 and the spring 13 can be formed of metal, and the remainder of plastics or metal; the plastics could be an injection-moulded fibre-filled plastics such as "Nylotron G", a fibre-filled nylon containing molybdenum sulphide powder as a lubricant.

FIGS. 3a TO 3g

The operation of the device is illustrated in FIGS. 3a to 3g. FIG. 3a shows the at-rest position, as the slider teeth 9 begin to move, subsequently moving the rotor teeth 11 against the force of the spring 13 (see FIG. 3b). The retaining teeth 10 force both the slider teeth 9 and the rotor teeth 11 to move axially, the rotor teeth 11 sliding against the retaining teeth 10 until the rotor teeth 11 reach the ends of the retaining teeth 10, the rotor teeth 11 being forced against the retaining teeth 10 by the inter-engagement of the respective inclined flanks 17, 19. The tooth form, particularly of the leading flanks 16 of the slider teeth 9, is such that the interaction between the tips (crests) of the rotor teeth 11 and the flanks 16 does not cause jamming and the slider teeth 9 push the rotor teeth 11 ahead of them. When the rotor teeth 11 reach the ends of the retaining teeth 10 (see FIG. 3c), the rotor teeth 11 snap over the ends of the retaining teeth 10, being rotated by the compressed spring 13, and click against the next slider teeth 9 (FIG. 3d), signalling the end of the movement of the male member 2. The leading flanks 16 of the slider teeth 9 are less inclined than the trailing flanks 17 as this provides more abrupt engagement and a better snap or click. The hump shape of the slider teeth 9 ensures that the rotor teeth 11 are properly trapped against, and pressed against, the retaining teeth 10.

The male member 2 is now retracted to begin its return motion (FIG. 3e) and the rotor teeth 11 can and normally will (depending on how far in the slider 8 is pushed and how fast it returns) cam over the ends of the retaining teeth 10 as the rotor teeth 11 continue to rotate in the same sense. During this return movement, the spring 13 pushes the rotor 12 and hence the slider 8 by the inter-engagement of the teeth 9, 11. The rotor teeth 11 thus ride up the next slider teeth 9. As the motion continues (FIG. 3f), the tips of the rotor teeth 11 reach the tips of the slider teeth 9, which are in the form of a smooth transition between the flanks 16, 17, and the rotor teeth 11 then snap into their final position (generally as in FIG. 3g), snapping against the next retaining teeth 10 and the flanks 17 of the next slider teeth 9.

In this operation, the rotor 12 has precessed one tooth pitch, and its internal cam surface has moved the locking balls 5 radially inwards to the maximum extent, the female and male members 1, 2 then being fully locked together. The arrangement of the cam surface can be such that when the first snap occurs (FIG. 3a), the female and male members 1, 2 are already locked together.

On unlocking, the same sequence occurs. At FIG. 3d, the first snap, the members 1, 2 will normally still be locked together. At FIG. 3g, the locking balls 5 are completely free to move out of the annular groove 4.

Thus the single spring 13 has returned the slider 7 to its initial position, and a snap or click action has been obtained at each end of the stroke.

FIGS. 4 AND 5

Figure 4:
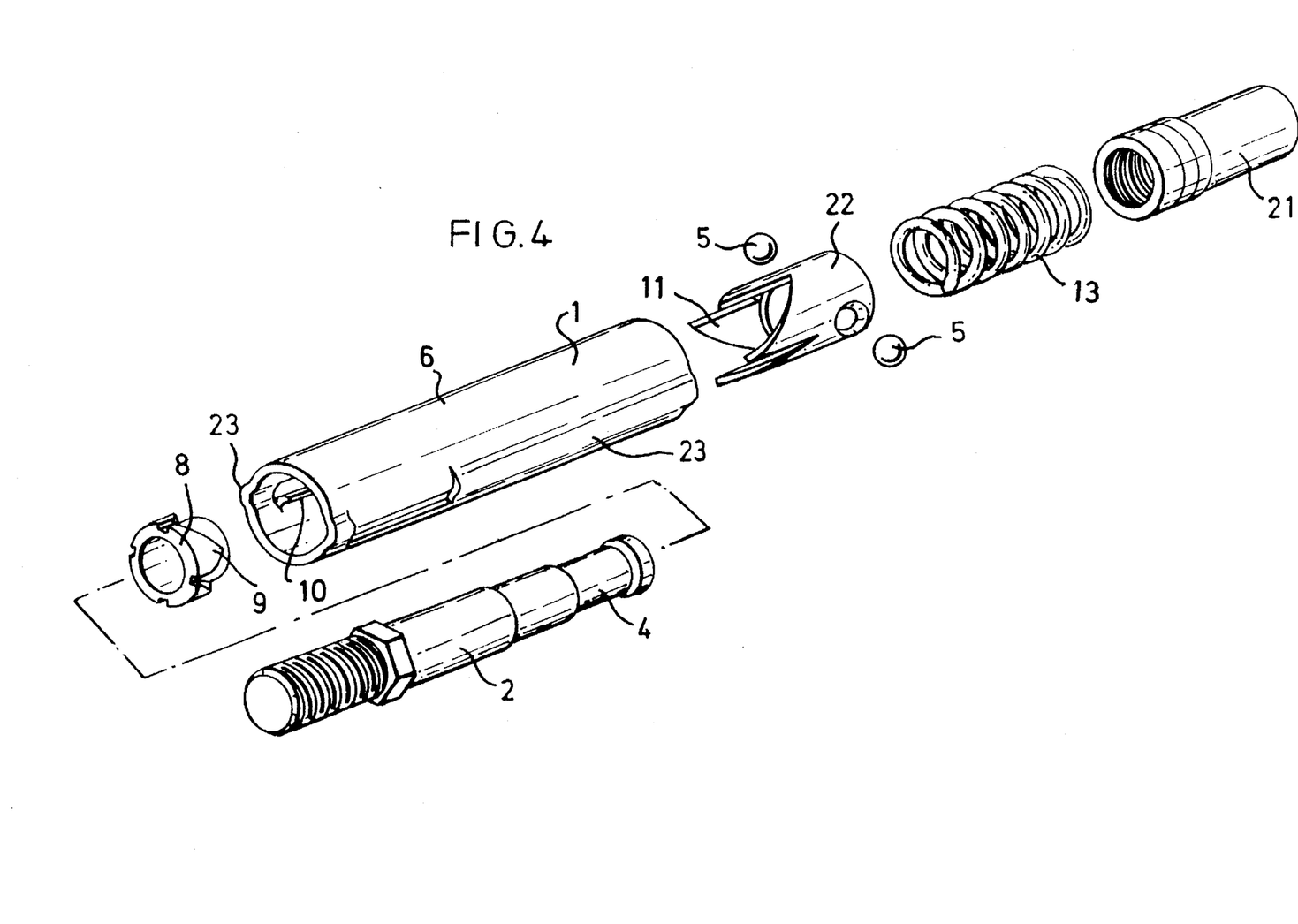
FIG. 4 is an exploded, isometric view of a second device in accordance with the invention.
Figure 5:
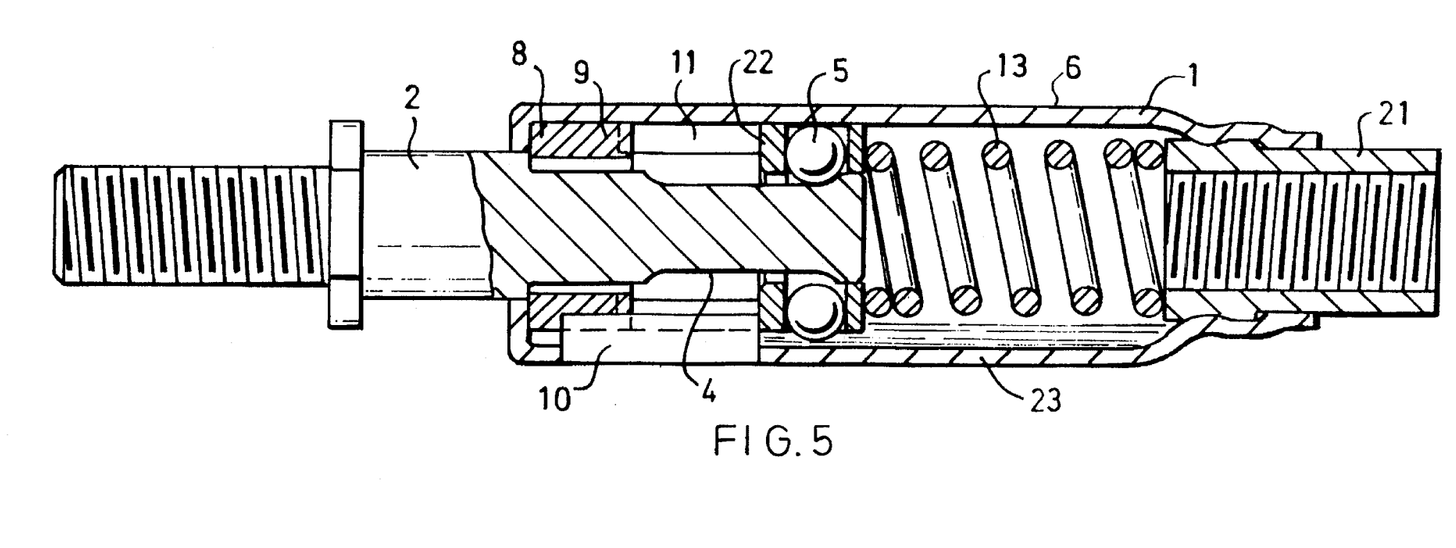
FIG. 5 is a view, mainly an axial section, of the second device.

Items carrying out the same or corresponding functions those in FIGS. 1 and 2 are referenced with the same reference numerals. The device of FIGS. 4 and 5 is a low-cost device. The female member 1 comprises a housing which can be produced on a cold heading machine, and swaged onto a suitable connector bushing or end terminal 21. To reduce size, a captive screw can be swaged into the housing 6, to provide a connection.

Unlike the arrangement in FIGS. 1 and 2, the locking balls 5 are carried in a rotor 22 (corresponding to the rotor 12 of FIGS. 1 and 2) rather than in the slider 8. For this reason, there is a long angular recess 4 rather than an annular groove. As can be seen in FIG. 4, the housing 6 of the female member 1 is formed with two diametrically-opposite lobes, bulges or flutes 23 which, on the inside of the housing 6, form recesses. For clarity, the upper part of FIG. 5 shows the unfluted section of the housing 6 whereas the lower part shows the bulge 23. The housing 6 can be extruded with the fluting. In order to provide the retaining teeth 10, an internally-projecting tab is formed, by upsetting the flutes inward, either by notching and dimpling or by forming punched tabs (the latter being shown). FIG. 4 shows that the number of slots in the slider 8 need not be equal to the number of retaining teeth 10, but can be a whole number multiple (in this embodiment 2) of the retaining teeth 10, according to the strength of the retaining teeth 10 and manufacturing convenience.

The operation of the device of FIGS. 4 and 5 is the same as that of FIGS. 1 and 2. There are only four teeth 9, 11 on the slider 8 and rotor 12, and only two retaining teeth 10, though any suitable number can be provided.

The device of FIGS. 4 and 5 can have its housing made of brass or bronze, the slider 8 and rotor 22 formed of high strength die-cast alloy or injection-moulded fibre-filled plastics such as "Nylotron G", and the male member 2 and end terminal or bushing 21 formed of cold-headed or screw machine stress proof steel. The locking balls 5 can be of standard 52100 steel or stainless steel. One method of assembly is to pre-crimp the housing of the female member 1 at the left-hand end and to load the parts into the right-hand end, following by crimping or swaging the housing over the end terminal 21. For a higher grade device, a shoulder ring can be added between the crimped left-hand end of the housing 6 and the slider 8.

The device of FIGS. 4 and 5 will normally have a greater length/diameter ratio than the device of FIGS. 1 and 2, but the construction enables the diameter to be very small, for instance 3 mm or less, with a stroke about equal to the diameter.

The disclosures of U.S. Pat. No. 4,709,454 and WO 90/15282 are incorporated herein by reference.

The present invention has been described above purely by way of example, and modifications can be made within the spirit of the invention.

We claim:

1. An axial locking device comprising first and second separable members which are relatively moveable with respect to each other along an axis, the separable members being lockable together by a first movement of the separable members relative to each other in one axial sense, followed by a relative return movement, and unlockable by a further relative movement in the first axial sense, wherein:

the second separable member comprises a locking projection; and the first separable member comprises a locking mechanism comprising:

a locking element for engaging the locking projection of the second separable member, the locking element being moveable between a locking position in which it engages the locking projection of the second separable member and a release position in which it does not engage the locking projection of the second separable member;

a slider moveable in an axial sense with respect to the first separable member and engagable by the second separable member when said first movement occurs, whereby actuation of the locking mechanism is initiated;

a rotor coacting with the locking element and relatively rotable always in the same rotary sense about said axis from a first, release angular position in which the rotor does not retain the locking element in its locking position to at least a second, locking angular position in which the rotor retains the locking element in its locking position, and subsequently to said first, release angular position;

first teeth substantially fixed with respect to the slider in a rotary sense;

second teeth substantially fixed with respect to the rotor in a rotary sense and co-acting with the first teeth, at least the second teeth having inclined flanks whereby when the first and second teeth move towards each other axially and engage, the first teeth apply rotary thrust to the second teeth and thereby rotate the rotor;

a spring means for applying biasing opposing said first movement and for applying axial biasing tending to engage the first and second teeth in the axial direction; and retaining members substantially fixed in a rotary sense with respect to the first teeth and relative to which the first teeth slide axially during actuation;

whereby during said first movement, a respective second tooth slides axially relative to a respective retaining member until the second tooth reaches the end of the retaining member whilst under the influence of rotary thrust applied by a respective first tooth which thereby biases the second tooth in a rotary sense against the retaining member, and when the second tooth reaches the end of the retaining member the second tooth is rotated by said rotary thrust, and engages the next first tooth with a click, and during said return movement, the respective second tooth is able to cam over the end of the respective retaining member whereby the second tooth rotates in the same rotary sense and is able to engage an end surface of the next first tooth, riding up the next first tooth until the second tooth reaches the crest of the first tooth and moving against the retaining member with a click, thereby rotating the rotor from said release angular position into said locking angular position, and during said further movement and a relative return movement therefrom, the rotor is rotated in a similar manner from said locking angular position into said release angular position.

2. The device of claim 1, wherein when the respective second tooth reaches the end of the retaining member and is rotated by said rotary thrust, the second tooth engages the next first tooth with a click.

3. The device of claim 2, wherein during said return movement, the second tooth rides up the next first tooth until the second tooth reaches the crest of the first tooth, and then moves against the retaining member with a click.

4. The device of claim 1, wherein during said return movement, the second tooth rides up the next first tooth until the second tooth reaches the crest of the first tooth, and then moves against the retaining member with a click.

5. The device of claim 1, wherein said spring means is such that there is a single spring for effecting return axial motion of both the first teeth and the second teeth.

6. The device of claim 5, wherein the second teeth are defined on the rotor and the spring acts directly on the rotor, biasing the second teeth in the direction of said return movement.

7. The device of claim 1, wherein said spring means is such that there is a single for applying biasing opposing said first movement, for applying axial biasing tending to engage the first and second teeth in the axial direction, and for effecting the return axial motion of both the first teeth and the second teeth.

8. The device of claim 1, wherein the first teeth define, relative to the direction of rotation of the second teeth, a leading flank defining a leading edge and a trailing flank defining a trailing edge, said leading edge projecting axially less than said trailing edge of the same tooth.

9. The device of claim 1, wherein the first teeth define, relative to the direction of rotation of the second teeth, a leading flank defining a leading edge, a trailing flank defining a trailing edge and a tooth portion between said leading edge and said trailing edge, said leading edge and said trailing edge projecting axially less than the tooth portion therebetween.

10. The device of claim 9, wherein the first teeth define, relative to the direction of rotation of the second teeth, an inclined leading flank and an inclined trailing flank.

11. The device of claim 1, wherein the second teeth define, relative to their direction of rotation, a leading flank which is substantially parallel to the axis and trailing flank which is inclined to the axis.

12. The device of claim 1, wherein the retaining members are square-ended teeth.

13. The device of claim 1, wherein the retaining members are substantially thinner, in the circumferential sense, than the first teeth or the second teeth.

14. The device of claim 1, and comprising a housing, wherein the retaining members are fixed relative to said housing, the first teeth are constrained only to axial motion relative to said housing, and the second teeth can move axially and can rotate relative to said housing.

15. The device of claim 1, wherein there is a plurality of first teeth between each respective pair of adjacent retaining members.

16. The device of claim 1, wherein the first teeth are integral with the slider.

17. The device of claim 1, wherein the slider defines an engagement surface at a substantial angle to the axis, for engagement by the second separable member when said first movement occurs, and wherein the locking element is in an axial sense between the first and second teeth and the engagement surface.

18. The device of claim 1, wherein the rotor defines a cam surface which rotates relative to the locking element when the rotor is rotated and cams the locking element into a position locking the first and second members together, and when the rotor is further rotated, permits the locking element to move into a position not locking the first and second members together, the locking element being substantially fixed in a rotary sense relative to the first member.

19. The device of claim 18, wherein the device comprises a housing and the cam surface is defined by the housing.

20. The device of claim 1, wherein the rotor defines a cam surface which rotates relative to the locking element when the rotor is rotated and cams the locking element into a position locking the first and second members together, and when the rotor is further rotated, permits the locking element to move into a position not locking the first and second members together, the cam surface being substantially fixed in a rotary sense relative to the first member.

21. An axial locking device comprising first and second separable members which are relatively moveable with respect to each other along an axis, the separable members being lockable together by a first movement of the separable members relative to each other in one axial sense, followed by a relative return movement, and unlockable by a further relative movement in the first axial sense, wherein:

the second separable member comprises a locking projection; and the first separable member comprises a locking mechanism comprising:

a locking element for engaging the locking projection of the second separable member, the locking element being moveable between a locking position in which it engages the locking projection of the second separable member and a release position in which it does not engage the locking projection of the second separable member;

a slider moveable in an axial sense with respect to the first separable member and engagable by the second separable member when said first movement occurs, whereby actuation of the locking mechanism is initiated;

a rotor coacting with the locking element and relatively rotable always in the same rotary sense about said axis from a first, release angular position in which the rotor does not retain the locking element in its locking position to at least a second, locking angular position in which the rotor retains the locking element in its locking position, and subsequently to said first, release angular position;

first teeth substantially fixed with respect to the slider in a rotary sense, each first tooth defining a crest;

second teeth substantially fixed with respect to the rotor in a rotary sense and co-acting with the first teeth, at least the second teeth having inclined flanks whereby when the first and second teeth move towards each other axially and engage, the first teeth apply rotary thrust to the second teeth and thereby rotate the rotor;

a spring means for applying biasing opposing said first movement for applying axial biasing tending to engage the first and second teeth in the axial direction, and for effecting the return axial motion of both the first teeth and the second teeth; and retaining members substantially fixed in a rotary sense with respect to the first teeth and relative to which the first teeth slide axially during actuation;

whereby during said first movement, a respective second tooth slides axially relative to a respective retaining member until the second tooth reaches the end of the retaining member whilst under the influence of rotary thrust applied by a respective first tooth which thereby biases the second tooth in a rotary sense against the retaining member, and when the second tooth reaches the end of the retaining member the second tooth is rotated by said rotary thrust, and engages the next first tooth with a click, and during said return movement, the respective second tooth is able to cam over the end of the respective retaining member whereby the second tooth rotates in the same rotary sense and is able to engage an end surface of the next first tooth, riding up the next first tooth until the second tooth reaches the crest of the first tooth and moving against the retaining member with a click, thereby rotating the rotor from said release angular position into said locking angular position, and during said further movement and a relative return movement therefrom, the rotor is rotated in a similar manner from said locking angular position into said release angular position.

22. The device of claim 21, wherein there is a single said spring for applying biasing opposing said first movement, for applying axial biasing tending to engage the first and second teeth in the axial direction, and for effecting the return axial motion of both the first teeth and the second teeth.

23. An axial locking device comprising first and second separable members which are relatively moveable with respect to each other along an axis, the separable members being lockable together by a first movement of the separable members relative to each other in one axial sense, followed by a relative return movement, and unlockable by a further relative movement in the first axial senses, wherein:

the second separable member comprises a locking projection; and the first separable member comprises a locking mechanism comprising:

a locking element for engaging the locking projection of the second separable member, the locking element being moveable between a locking position in which it engages the locking projection of the second separable member and a release position in which it does not engage the locking projection of the second separable member;

a slider moveable in an axial sense with respect to the first separable member and engagable by the second separable member when said first movement occurs, whereby actuation of the locking mechanism is initiated;

a rotor coacting with the locking element and relatively rotable always in the same rotary sense about said axis from a first, release angular position in which the rotor does not retain the locking element in its locking position to at least a second, locking angular position in which the rotor retains the locking element in its locking position, and subsequently to said first, release angular position;

first teeth substantially fixed with respect to the slider in a rotary sense;

second teeth substantially fixed with respect to the rotor in a rotary sense and co-acting with the first teeth, at least the second teeth having inclined flanks whereby when the first and second teeth move towards each other axially and engage, the first teeth apply rotary thrust to the second teeth and thereby rotate the rotor, each first tooth defining, relative to the direction of the rotation of the second teeth, a leading flank defining a leading edge, a trailing flank defining a trailing edge and a tooth portion therebetween and defining a crest, said leading edge projecting axially less said trailing edge of the same tooth and said leading edge and said trailing edge projecting axially less than the tooth portion therebetween;

a spring means for applying biasing opposing said first movement for applying axial biasing tending to engage the first and second teeth in the axial direction, and for effecting the return axial motion of both the first teeth and the second teeth, and retaining members substantially fixed in a rotary sense with respect to the first teeth and relative to which the first teeth slide axially during actuation;

whereby during said first movement, a respective second tooth slides axially relative to a respective retaining member until the second tooth reaches the end of the retaining member whilst under the influence of rotary thrust applied by a respective first tooth which thereby biases the second tooth in a rotary sense against the retaining member, and when the second tooth reaches the end of the retaining member the second tooth is rotated by said rotary thrust, and engages the next first tooth with a click, and during said return movement, the respective second tooth is able to cam over the end of the respective retaining member whereby the second tooth rotates in the same rotary sense and is able to engage an end surface of the next first tooth, riding up the next first tooth until the second tooth reaches the crest of the first tooth and moving against the retaining member with a click, thereby rotating the rotor from said release angular position into said locking angular position, and during said further movement and a relative return movement therefrom, the rotor is rotated in a similar manner from said locking angular position into said release angular position.

24. The device of claim 23, wherein the slider defines an engagement surface at a substantial angle to the axis, for engagement by the second separable member when said first movement occurs, and wherein the locking element is in an axial sense between the first and second teeth and the engagement surface.

25. The device of claim 23, wherein the rotor defines a cam surface which rotates relative to the locking element when the rotor is rotated and cams the locking element into a position locking the first and second members together, and when the rotor is further rotated, permits the locking element to move into a position not locking the first and second members together.

* * * * *

UNITED STATES PATENT AND TRADEMARK OFFICE
CERTIFICATE OF CORRECTION

PATENT NO. : 5,530,999
DATED : July 2, 1996
INVENTOR(S) : Austen B. Barnes

It is certified that error appears in the above-indentified patent and that said Letters Patent is hereby corrected as shown below:

On the Title Page, Section [76] replace:
"[76]   Austen H. Barnes, 3407 Rolborn Road, RR #2 Queensville, Ontario, Canada, LOG IR0"

With
--[76]   Austen B. Barnes, 3407 Holborn Road, RR #2 Queensville, Ontario, Canada, LOG IR0--

Signed and Sealed this

Ninth Day of December, 1997

Attest:

BRUCE LEHMAN

*Attesting Officer*           *Commissioner of Patents and Trademarks*